United States Patent [19]

Bailly et al.

[11] Patent Number: 5,681,893
[45] Date of Patent: Oct. 28, 1997

[54] POLYMER MIXTURE COMPRISING POLYARYLENE SULPHIDE ELASTOMERIC POLYMER AND METAL SALT

[75] Inventors: Christian Maria Emile Bailly, Kalmthout, Belgium; Jeremy Paul Shaw, Halsteren, Netherlands; Chorng-Fure Robin Hwang, Delmar, N.Y.

[73] Assignee: General Electric Company, Pittsfield, Mass.

[21] Appl. No.: 526,655

[22] Filed: Sep. 11, 1995

Related U.S. Application Data

[63] Continuation of Ser. No. 253,815, Jun. 3, 1994, abandoned, which is a continuation of Ser. No. 27,686, Mar. 8, 1993, abandoned.

[30] Foreign Application Priority Data

Mar. 10, 1992 [NL] Netherlands ............... 9200440

[51] Int. Cl.⁶ ............... C08G 63/48; C08G 75/00
[52] U.S. Cl. ............... 525/64; 525/189; 525/537
[58] Field of Search ............... 525/64, 189, 537

[56] References Cited

U.S. PATENT DOCUMENTS

| | | | |
|---|---|---|---|
| 4,490,522 | 12/1984 | Kawabata et al. | 528/222 |
| 4,801,664 | 1/1989 | Nesheiwat et al. | 525/537 |
| 4,820,759 | 4/1989 | Ichikawa et al. | 525/537 |
| 4,889,893 | 12/1989 | Kobayashi et al. | 525/537 |
| 5,160,786 | 11/1992 | Nakai | 525/537 |
| 5,204,405 | 4/1993 | Orikasa et al. | 525/64 |

FOREIGN PATENT DOCUMENTS

| | | |
|---|---|---|
| 0345094 | 12/1989 | European Pat. Off. . |
| 0360544 | 3/1990 | European Pat. Off. . |
| 0424842 | 5/1991 | European Pat. Off. . |
| WO-A-9118054 | 11/1991 | European Pat. Off. . |
| WO-A-9118055 | 11/1991 | European Pat. Off. . |
| 0484273 | 5/1992 | European Pat. Off. . |
| 5792044 | 6/1982 | Japan . |
| 9118055 | 11/1991 | WIPO . |

OTHER PUBLICATIONS

Database WPIL Week 8643, 17 Dec. 1986, Derwent Publications Ltd., London, GB; AN 86-282593 & JP-A-61 207 462 (Dainippon Ink) 13 Sep. 1986 *abstract*.

*Primary Examiner*—Helen Lee

[57] ABSTRACT

The invention relates to a polymer mixture comprising A) a polyarylene sulphide, B) an elastomeric polymer having reactive groups which are capable of reacting with the polyarylene sulphide, the polymer mixture moreover comprising as constituent C) a metal salt of a fatty acid having a melting temperature lower than the compounding temperature of the polymer mixture. The presence of the metal salt C contributes to an improvement of the mechanical properties, in particular the ductility.

15 Claims, No Drawings

POLYMER MIXTURE COMPRISING POLYARYLENE SULPHIDE ELASTOMERIC POLYMER AND METAL SALT

This is a continuation of Ser. No. 08/253,815 filed on Jun. 3, 1994 abandoned, which is a continuation of Ser. No. 08/027,686 filed Mar. 8, 1993, now abandoned.

The invention relates to a polymer mixture comprising A) a polyarylene sulphide and B) an elastomeric polymer having reactive groups which are capable of reacting with the polyarylene sulphide, the polymer mixture moreover comprising as constituent C) a non-elastomeric metal salt having a melting temperature lower than the compounding temperature of the polymer mixture with the exception of metal salts of dihydrocarbyldithiophosphinic acid.

Polymer mixtures which comprise a polyarylene sulphide and an elastomeric polymer having reactive groups are generally known. JP-A-59/152,953, for example, discloses polymer mixtures which consist of 50–99.5% by weight of a polyarylene sulphide and 50–0.5% by weight of olefin polymers which are built up from alpha-olefins and glycidyl esters of alpha,beta-unsaturated acids. WO-A-91/18054 discloses similar polymer mixtures in which, however, special polyarylene sulphides, namely polyarylene sulphides having reactive amine groups, are used. WO-A-91/18055 discloses the use of polyarylene sulphides with carboxylic acid groups in such mixtures.

EP-A-0,345,094 describes polymer mixtures comprising a polyphenylene sulfide, an epoxy group-containing olefinic polymer and at least one elastomer. The elastomer may be in the form an elastomeric metal salt. Due to its elastomeric character it serves to improve the impact. According to EP-A-0,345,094 metal salts of thiophosphinic acid as disclosed in U.S. Pat. No. 4,421,910 may be added to control the degree of cross linking of the polyarylene sulphide. Said salts have been excluded from the scope of the claims.

It has been found that the mechanical properties, in particular the ductility, of the above-mentioned mixtures and of similar mixtures can be further improved by the addition of a non-elastomeric metal salt having a melting temperature lower than the compounding temperature of the polymer mixture.

The polymer mixture according to the invention comprises at any rate the constituents A, B and C mentioned hereinbefore. The polymer mixture may moreover comprise further constituents, for example, agents to improve the impact strength, fillers, reinforcing fibres, stabilisers, catalysts, dyes and pigments, auxiliary agents to improve the processability, agents to improve the flame-retarding properties.

In some cases it offers advantages to use an elastomeric polymer having reactive groups and a "standard" agent to improve the impact strength. The advantages to be obtained by using a "standard" agent to improve the impact seem to depend to a great extent of the exact nature of the polyarylene sulphide in the blend.

Suitable "standard" agents to improve the impact strength are for example poly-octenamers, vinylaromaticdieen blockcopolymers (the non-hydrogenated and the partially hydrogenated types), graft copolymers with a rubbery graft basis whereupon one or more monomers have been grafted. The graft basis can consist mainly of a diene rubber or an acrylic rubber.

Constituent A; Polyarylene Sulphide

Polyarylene sulphides are generally known compounds. They are described, for example, in EP-A-0327300; EP-A-0369244 and EP-A-0345094. The polyarylene sulphides described in the Patent Applications WO-A-91/18054 and WO-A-91/18055 mentioned already hereinbefore are also suitable. The polyarylene sulphides described therein comprise reactive carboxylic acid groups or reactive amine groups. It is possible to use linear or branched polyarylene sulphides in the polymer mixture according to the invention. A polyphenylene sulphide is preferably used.

Constituent B; Elastomeric Polymer Having Reactive Groups

Many elastomeric polymers having reactive groups are known. Elastomeric polymers in the sense of the present Patent Application are polymers having a glass transition temperature of less than 0° C., preferably less than minus 15° C. The elastomeric polymer may comprise reactive groups which are incorporated in the chain or which are grafted on the main chain by a graft reaction.

Suitable reactive groups are, for example, carboxylic acid groups and groups derived therefrom or epoxy groups. Suitable carboxylic acid groups are, for example, groups derived from maleic acid anhydride. Suitable epoxy groups are, for example, the groups derived from a glycidyl ester of an alpha,beta-unsaturated carboxylic acid, for example, glycidyl methacrylate. Particularly suitable are the elastomers having reactive groups of glycidyl methacrylate. Suitable elastomers are, for example, elastomers on the basis of acrylates or of alpha-olefins.

Particularly suitable for use in the polymer mixture according to the invention are copolymers derived for more than 50% by weight from an alpha-olefin as an elastomeric constituent. Such copolymers may comprise, for example, 60–99.5% by weight of units derived from an alpha-olefin and 0.5–40% by weight of units derived from a glycidyl ester of an alpha,beta-unsaturated carboxylic acid.

The polymer mixture according to the invention may comprise as constituent B, for example, one or more of the following copolymers or terpolymers: ethylene—glycidyl acrylate copolymers, ethylene—glycidyl methacrylate—vinyl acetate terpolymers, ethylene—glycidyl methacrylate—methyl acrylate terpolymers, ethylene—ethyl acetate—glycidyl methacrylate terpolymers.

The content of units having reactive groups usually varies from 0.5–40% by weight, or even more preferably from 2–15% by weight.

All the elastomeric products having reactive groups mentioned in the literature references cited hereinbefore are to be considered.

Constituent C; Metal Salt

The polymer mixture according to the invention comprises as the third essential constituent a non-elastomeric metal salt having a melting temperature lower than the compounding temperature of the polymer mixture with the exception of metal salts of dihydrocarbyldithiophosphinic acid. It is of importance for the melting temperature of the metal salt to be lower than the compounding temperature of the polymer mixture; when the melting temperature is equal to or higher than the compounding temperature, the metal salt is less effective for improving the mechanical properties. The compounding temperature is the temperature at which the constituents of the polymer mixture according to the invention are mixed to a more or less homogeneous mass in the melted condition or a similar condition. The compounding temperature to be used depends on the nature of the constituents used, on the optional presence of further constituents in addition to the constituents A, B and C already mentioned, and on the mutual quantities of the various constituents. The compounding temperature generally is above 285° C., usually between approximately 300° and 350° C.

Suitable metal salts are inorganic or organic salts, more preferably metal salts of organic acids. suitable organic acids are saturated and unsaturated aliphatic carboxylic acids, aromatic carboxylic acids, aliphatic and aromatic sulphonic acids and salts of alkyl hydrogen sulphates. The organic part of the salts preferably has a molecular weight below 500, more preferably below 300.

Specific organic acids include, but are not restricted to: benzoic, palmitic, lauric, acetic, stearic, gluconic, as well as dodecyl benzene sulphonic acids.

Suitable metal salts may be taken from a broad range of metals provided that the salt has a melting temperature lower than the PPS compoundig temperature. Metals such as calcium, aluminium and zinc are preferred but this does not preclude metals such as sodium, lithium, potassium, barium, beryllium, magnesium, copper, cobalt, and iron.

In particular metal salts of stearic acid are preferred.

The various constituents of the polymer mixture according to the invention are preferably used in the following mutual ratio:

60–98.95% by weight of constituent A,

40% by weight of constituent B, and 0.05–5% by weight of constituent C, calculated with respect to the total quantity of constituents A, B and C together.

All the patent publications mentioned hereinbefore are considered to be incorporated in the present Patent Application by reference.

The following constituents for preparing the polymer mixtures were used in the examples:

PPS-1: a polyphenylene sulphide obtained by reaction of disodium sulphide and para-dichlorophenyl in N-methyl-2-pyrrolidone according to the method of U.S. Pat. No. 3,354,129 succeeded by a curing step by air oxidation at elevated temperature. The polymer had a capillary melt viscosity of 290 Pa.s (300° C.; 115 sec −1; DIN 54811) and a content of free amine groups of approximately 60 milli-equivalents per kilogramme of PPS (calculated on the basis of the nitrogen content).

PPS-2: A polyphenylene sulphide obtained by reaction of 3,5-diamino chlorobenzene, sodium disulphide and paradichlorophenyl (in a molar ratio of 0.016/1.00/0.984) according to the method indicated for PPS-1. The polymer had a capillary melt viscosity of approximately 290 Pa.s and a free amine content of approximately 107 amine milli-equivalents per kilogramme of PPS.

PPS-3: a linear polyphenylene sulphide having a capillary melt viscosity of 140 Pa.s and an amine content of 48 milli-equivalents per kilogramme of PPS. This product has been prepared according to the method of U.S. Pat. No. 3,919,177.

PPS-4: a polyphenylene sulphide with an amine content of 136 milliequivalents per kilogram, obtained by reacting 3,5-dichloro-aniline, sodium sulphide and para-dichlorophenyl (in a molar ratio of 0.009/1/0.991), according to the method indicated for PPS-1. The capillary melt viscosity was about 290 Pa.s EGMA: an ethylene-glycidyl methacrylate copolymer having an ethylene content of approximately 88%, a glycidyl methacrylate content of approximately 12% having an MFR (melt flow rate, according to JIS K 6760) of 3 grammes per 10 minutes at 190° C.

EGMA VA-1: an ethylene—glycidyl methacrylate—vinyl acetate terpolymer having a glycidyl methacrylate (GMA) content of 3% by weight and a vinyl acetate content of 8% by weight and an MFR of 7 grammes per 10 minutes.

EGMA VA-2: an ethylene—GMA—VA terpolymer having 12% by weight of GMA and 5% by weight of VA and an MFR of 3 grammes per 10 minutes.

EGMA-VA-3: an ethylene—GMA—VA terpolymer having 12% by weight of GMA, 5% by weight of VA and an MFR of 7 grammes per 10 minutes.

EGMA EA: an ethylene—ethyl acrylate—GMA terpolymer having 7% by weight of GMA and 26% by weight of ethyl acrylate, a melt flow rate of 6 grammes per 10 minutes (190° C./21.6N; ASTM D 1238).

HDPE: a high-density polyethylene having a melt flow rate of 10 grammes per 10 minutes.

LDPE: a low-density polyethylene having a melt flow rate of approximately 22 grammes per 10 minutes.

OCT: a polyoctenamer having a molecular weight (Mw relative with respect to polystyrene) of 232,000 and a viscosity according to Mooney (ML4) of 5 at 100° C.

I.M.: a styrene-ethylene/butylene-styrene blockcopolymer with a S/EB ratio of 32/68 and a total molecular weight of about 270.000.

CaCO3: calcium carbonate

CB: Carbon black

Mica: a mica powder having such a particle size that 75% by weight is smaller than 10 micrometres and 15% by weight is smaller than 2 micrometres.

Clay: an aminosilane-calcined clay 52% by weight of which has a particle size smaller than 2 micrometres.

Glass fibres: chopped glass fibres (approximately 4.5 mm long).

Zn St: zinc stearate, melting-point 130° C.

Ca St: calcium stearate; melting-point 179° C.

Al St: aluminium stearate; melting-point 103° C.

The above-mentioned constituents were compounded in various double-blade extruders with a temperature adjustment of on an average 290° C. in the quantities as indicated hereinafter in the tables A, B, C, D, E and F.

The compositions according to the tables A, B, D and F were compounded in a first extruder at a specific energy of 0.46 kWh/kg; the compositions according to the examples in the tables C and E were compounded in a second extruder at a specific energy of 0.26 kWh/kg. The compositions according to the table G have been compounded in a third extruder at a specific energy of 0.25 kwh/kg. The resulting mixture was extruded and pelletised. Standardised test pieces were made from the resulting pellets (by injection-moulding at an average adjusted temperature of approximately 290° C.).

For compositions according to table D the adjusted temperature values for injection moulding were approximately 20° C higher.

The impact strength according to Izod without and with notch (ASTM D 256), the yield strength (ASTM D638) (both at room temperature) and the tensile elongation (ASTM D638) were determined. All the results are also recorded in the tables hereinafter.

Examples I–VI Incl. and Comparative Examples A–D Incl.

Starting from the above-mentioned constituents various polymer mixtures were prepared having a composition as recorded in table A hereinafter. The found properties are also recorded in table A.

Due to the presence of EGMA comparative example B has a better impact strength than comparative example A; this is known per se.

According to the invention it has now been found that the impact strength can be further improved by the addition of a constituent C (metal salt). For this purpose see the examples I, II and III in comparison with example B.

The improvement does not occur when only an elastomer without reactive groups is present (see comparative examples C and D). Combination of two polymers (one elastomer having reactive groups and one other polymer without) is possible; for this purpose see examples IV, V and VI.

TABLE A

| Examples | A | B | I | II | III | C | IV | V | VI | D |
|---|---|---|---|---|---|---|---|---|---|---|
| Composition (wt. parts) | | | | | | | | | | |
| PPS-1 | 100 | 90 | 89.8 | 89.7 | 89.7 | 89.7 | 89.7 | 89.7 | 89.7 | 89.7 |
| EGMA | — | 10 | 10 | 10 | 10 | — | 5 | 5 | 5 | — |
| OCT | — | — | — | — | — | — | — | — | 5 | 10 |
| HDPE | — | — | — | — | — | — | — | 5 | — | — |
| LD PE | — | — | — | — | — | 10 | 5 | — | — | — |
| Al St | — | — | — | — | 0.3 | 0.3 | 0.3 | 0.3 | 0.3 | 0.3 |
| Ca St | — | — | — | 0.2 | — | — | — | — | — | — |
| Zn St | — | — | 0.2 | — | — | — | — | — | — | — |
| Properties | | | | | | | | | | |
| Izod impact strength (no notch) (J/m) | 154 | * | * | * | * | 175 | * | * | * | 370 |
| Izod notch impact strength (J/m) | 24 | 35 | 47 | 48 | 57 | 29 | 45 | 42 | 41 | 30.5 |
| Yield strength (MPa) | 53 | 60 | 61 | 60 | 61 | 38 | 56 | 66 | 60 | 52 |
| Tensile elongation (%) | 1.5 | 6.6 | 12.6 | 13.2 | 12.7 | 1.7 | ND | 13 | 11 | 2.3 |

\* = not fractured
ND = not determined

Example VII and Comparative Examples E and F

The composition of the polymer mixtures is recorded in the following Table B; two for comparison, one according to the invention. A polyphenylene sulphide having a comparatively high content of amino groups has always been used with these polymer mixtures (PPS-2). In that case also the addition of a metal salt (Example VII) results in a further improvement of the impact strength.

TABLE B

| Examples | E | F | VII |
|---|---|---|---|
| Composition (wt. parts) | | | |
| PPS-2 | 100 | 90 | 89.7 |
| EGMA | — | 10 | 10 |
| Al St | — | — | 0.3 |
| Properties | | | |
| Izod impact strength no notch (J/m) | 200 | * | * |
| Izod notched impact strength (J/m) | 24 | 50 | 68 |
| Yield strength (MPa) | 62 | 57 | 58 |
| Tensile elongation (%) | 1.6 | 13.2 | 18.7 |

\* = not fractured

Examples VIII-XII Incl.

The composition and the properties according to these examples are recorded in Table C hereinafter Various elastomers having reactive groups have been used in these examples.

It may be seen from these examples that a higher content of reactive groups in general leads to better notch impact values when the remaining constituents of the elastomer are the same (examples X and XI in comparison with example VIII). It may furthermore be seen that an elastomer having units derived from ethyl acrylate (example IX) provides a better impact strength.

TABLE C

| Examples | VIII | IX | X | XI | XII |
|---|---|---|---|---|---|
| Composition (wt. parts) | | | | | |
| PPS-1 | 89.8 | 89.8 | 89.8 | 89.8 | 69.8 |
| EGMA VA-1 | 10 | — | — | — | — |
| EGRA EA | — | 10 | — | — | — |
| EGMA VA-2 | — | — | 10 | — | — |
| EGMA VA-3 | — | — | — | 10 | — |
| EGMA | — | — | — | — | 10 |
| Zn St | 0.2 | 0.2 | 0.2 | 0.2 | 0.2 |
| Properties | | | | | |
| Izod impact strength no notch (J/m) | 1134 | * | * | * | * |
| Izod notched impact strength (J/m) | 43.5 | 68.5 | 46.5 | 49.5 | 49.5 |
| Yield strength (MPa) | 66 | 61 | 62 | 63 | 65 |
| Tensile elongation (%) | 3.4 | 6 | 7 | 6.5 | 7 |

\* = not fractured

Examples XIII-XV Incl., Comparative Examples G-I Incl.

In these examples mineral fillers have always been used in the polymer mixture. It may be seen from the results (and compositions) recorded in Table D that the addition of a metal salt in that case also leads to an improvement.

TABLE D

| Examples | XIII | G | XIV | XV | H | I |
|---|---|---|---|---|---|---|
| Composition (wt. parts) | | | | | | |
| PPS-1 | 89.7 | 100 | 89.7 | 89.7 | 60 | 60 |
| EGMA | 10 | — | 10 | 10 | — | — |
| Al St | 0.3 | — | 0.3 | 0.3 | — | — |
| Mica | 20 | 20 | — | — | — | — |
| CaCO3 | — | — | 40 | — | — | 40 |
| Clay | — | — | — | 40 | 40 | — |

TABLE D-continued

| Examples | XIII | G | XIV | XV | H | I |
|---|---|---|---|---|---|---|
| Properties | | | | | | |
| Izod impact strength no notch (J/m) | 618 | 335 | 244 | 546 | 202 | 130 |
| Izod notched impact strength (J/m) | 33 | 21 | 28 | 37 | 16 | 10 |
| Yield strength (MPa) | 47 | 72 | 49 | 59 | 69 | 56 |
| Tensile elongation (%) | 2 | 1 | 2.7 | 4.5 | 1 | 0.8 |

Example XVI and Comparative Example K

In these examples a linear polyphenylene sulphide was used (the PPS of all previous examples is branched, i.e. has a main chain with side chains).

It has proved possible to obtain a better notched impact strength when using linear polyphenylene sulphides, also when the amine content is low. See Table E.

TABLE E

| Examples | K | XVI |
|---|---|---|
| Composition (wt. parts) | | |
| PPS-3 | 100 | 89.8 |

TABLE E-continued

| Examples | K | XVI |
|---|---|---|
| EGMA | — | 10.0 |
| Zn St | — | 0.2 |
| Properties | | |
| Izod impact strength no notch (J/m) | 245 | * |
| Izod notched impact strength (J/M) | 22 | 87 |
| Yield strength (MPa) | 66 | 60 |
| Tensile elongation (%) | 1.9 | 12.8 |

* = not fractured

Examples XVII–XXIV Incl.

In these examples polymer mixtures were prepared with glass fibres or with glass fibres and clay. All the constituents, except the glass fibres, were added at the inlet of the extruder, the glass fibres were added at a point nearer to the outlet aperture of the extruder.

It may be seen from the results recorded in Table F that good results were obtained by the addition of a metal salt also when glass fibres or glass fibres and clay are incorporated in the polymer mixture. An elongation of 2.5% for a PPS composition filled with 40% by weight (example XXIV) is very good in itself.

TABLE F

| Examples | XVII | XVIII | XIX | XX | XXI | XXII | XXIII | XXIV |
|---|---|---|---|---|---|---|---|---|
| Composition (wt. parts) | | | | | | | | |
| PPS-1 | 89.7 | 89.7 | 79.4 | 79.4 | 89.7 | 89.7 | 89.7 | 89.7 |
| EGMA | 10 | 10 | 20 | 20 | 10 | 10 | 10 | 10 |
| Al St | 0.3 | 0.3 | 0.6 | 0.6 | 0.3 | 0.3 | 0.3 | 0.3 |
| Glass fibers | 10 | 16 | 27 | 20 | 30 | 30 | 20 | 40 |
| Clay | — | — | — | — | 5 | 10 | 10 | 5 |
| Properties | | | | | | | | |
| Izod impact strength no notch (J/m) | 545 | 580 | 555 | 510 | 459 | 455 | 465 | 348 |
| Izod notched Impact strength (J/m) | 55 | 59 | 82 | 75 | 37 | 38 | 41 | 27 |
| Yield strength (MPa) | 86 | 113 | 111 | 97 | 69 | 79 | 77 | 65 |
| Tensile elongation (%) | 3.2 | 2.8 | 2.3 | 216 | 3.1 | 3.1 | 3.2 | 2.5 |

Examples XXV–XXVII; comparative examples L–O

In these examples an additional "standard" agent for improving the impact has been added. As a standard agent a styrene-ethylene/butylene-styrene block copolymer (IM) has been used. The composition and the properties are given in following table G.

| | Examples | | | | | | |
|---|---|---|---|---|---|---|---|
| | L (2153) | M (2155) | XXV (2154) | N (2165) | XXVI (2166) | O (2167) | XXVII (2168) |
| Composition (wt. parts) | | | | | | | |
| PPS-3 M2588 | 90 | 90 | 90 | — | — | — | — |
| PPS-4 | — | — | — | 80 | 80 | 80 | 80 |

-continued

|  | Examples | | | | | | |
|---|---|---|---|---|---|---|---|
|  | L (2153) | M (2155) | XXV (2154) | N (2165) | XXVI (2166) | O (2167) | XXVII (2168) |
| B-157 |  |  |  |  |  |  |  |
| EGMA (Igetabond) | 10 | 6 | 6 | 12 | 12 | 20 | 20 |
| LM. (KG1651) | — | 4 | 4 | 8 | 8 | — | — |
| Zn St. | — | — | 0.2 | — | 0.2 | — | 0.2 |
| Properties |  |  |  |  |  |  |  |
| Izod Notch impact strength (J/m) | 50 | 88.2 | 132 | 27 | 28 | 27 | 49 |
| Tensile elongation (%) | 17.5 | 34.8 | 31.8 | 8.1 | 10.3 | 8.1 | 20.4 |

From a comparison between comparative examples M and L it can be seen that replacing a part of constituent B (in this case EGMA) results in an increase in Izod notch impact strength and tensile elongation. In comparative examples N and O this replacement does not give a similar increase. This is probably due to the different type of PPS used.

By adding zinc stearate to the composition of comparative example M one obtains the composition of example XXV (according to the invention). This addition results in a further increase of the Izod notch impact strength.

In the case of example XXVI the addition of zinc stearate give a minor improvement (with respect to comparative example N) in Izod notch impact strength and tensile elongation. In the case of example XXVII the addition of zinc stearate gives a far greater improvement (with respect to comparative example O) in Izod notch impact strength and tensile elongation. The reason for this behavior is not understood; in particular not since the same PPS has been used in comparative examples N, O and in examples XXVI and XXVII.

It can be concluded however that in all cases the addition of a salt like zinc stearate gives improvement in Izod notch impact.

We claim:

1. A polymer mixture comprising:
   A) a polyarylene sulfide present in an amount from 60–98.95% by weight of the mixture and selected from the group consisting of polyarylene sulfides comprising reactive carboxylic acid groups and polyarylene sulfides comprising reactive amine groups;
   B) an elastomeric polymer having epoxy reactive groups which are capable of reacting with the polyarylene sulfide, wherein said elastomeric polymer is present in an amount from 1–40% by weight of the mixture; and
   C) a non-elastomeric metal salt of an organic acid present in an amount from 0.05–5% by weight of the mixture and said non-elastomeric metal salt of an organic acid having a melting temperature lower than approximately 285° C. with the exception of metal salts of dihydrocarbyldothiophosphinic acid, said metal of constituent C) being selected from the group consisting of calcium, aluminum, zinc, sodium, lithium, potassium, barium, beryllium, magnesium, copper, cobalt, and iron; and wherein said polymer mixture is compounded at a temperature above 285° C.

2. A polymer mixture as claimed in claim 1, wherein constituent B) is built up for more than 50% by weight from units derived from an alpha-olefin.

3. A polymer mixture as claimed in claim 1, wherein constituent B) comprises units derived from an alpha-olefin and a glycidyl ester of an alpha,beta-unsaturated carboxylic acid.

4. A polymer mixture as claimed in claim 1, wherein the polymer mixture comprises a salt of stearic acid as constituent C).

5. A polymer mixture as claimed in claim 1, wherein constituent A is built up for 60–99.5% by weight from units derived from an alpha-olefin and 0.5–40% by weight from units derived from a glycidyl ester of an alpha,beta-unsaturated carboxylic acid.

6. A polymer mixtures as claimed in claim 1 wherein the mixture further comprises at least one further agent to improve the impact strength.

7. Articles formed from the polymer mixture as claimed in claim 1.

8. A polymer mixture as claimed in claim 1, wherein said polymer mixture consists essentially of said polyarylene sulphide, said elastomeric polymer having epoxy reactive groups, and said non-elastomeric metal salt.

9. A polymer mixture as claimed in claim 1, wherein said polymer mixture consists of said polyarylene sulphide, said elastomeric polymer having epoxy reactive groups, and said non-elastomeric metal salt.

10. The polymer mixture as claimed in claim 1, wherein the polymer mixture comprises 60% to 90% by weight of the polyarylene sulfide, 6% to 20% by weight of the elastomeric polymer and 0.2% to 0.6% by weight of the non-elastomeric metal salt.

11. The polymer mixture as claimed in claim 10, wherein the elastomeric polymer comprises units derived from an alpha-olefin and a glycidyl ester of an alpha, beta- unsaturated carboxylic acid.

12. The polymer mixture as claimed in claim 10, wherein the non-elastomeric metal salt is a stearate salt.

13. A polymer mixture comprising:
   A) a polyarylene sulfide comprising reactive amine groups present in an amount from 60–98.95% by weight of the mixture;
   B) an elastomeric polymer having epoxy reactive groups which are capable of reacting with the polyarylene sulfide, wherein said elastomeric polymer is present in an amount from 1–40% by weight of the mixture; and
   C) a non-elastomeric metal salt of an organic acid present in an amount from 0.05–5% by weight of the mixture and said non-elastomeric metal salt of an organic acid having a melting temperature lower than approximately 285° C., with the exception of metal salts of dihydrocarbyldothiophosphinic acid, said metal of constituent C) being selected from the group consisting of calcium, aluminum, zinc, sodium, lithium, potassium, barium, beryllium, magnesium, copper, cobalt, and iron; and wherein said polymer mixture is compounded at a temperature above 285° C.

14. The polymer mixture of claim 13, wherein constituent B comprises units derived from an alpha-olefin and a glycidal ester of an alpha, beta-unsaturated carboxylic acid.

15. The polymer mixture of claim 13, wherein the non-elastomeric metal salt of an organic acid is non-elastomeric metal salt of stearic acid.

* * * * *